United States Patent [19]

Goto

[11] Patent Number: 5,289,382
[45] Date of Patent: Feb. 22, 1994

[54] METHOD OF AND SYSTEM FOR PRODUCING DATA FOR NUMERICALLY CONTROLLED MACHINING

[75] Inventor: Sunao Goto, Hiroshima, Japan

[73] Assignee: Mazda Motor Corporation, Hiroshima, Japan

[21] Appl. No.: 68,317

[22] Filed: May 28, 1993

Related U.S. Application Data

[63] Continuation of Ser. No. 623,682, Dec. 6, 1990, abandoned.

Foreign Application Priority Data

Dec. 7, 1989 [JP] Japan ................................ 1-318246

[51] Int. Cl.⁵ .............................................. G06F 15/46
[52] U.S. Cl. ........................... 364/474.21; 364/474.25; 364/191
[58] Field of Search ................. 364/474.21, 474.14, 364/474.25, 474.24, 474.27, 474.22, 474.18, 191, 192; 29/568; 318/568.1

[56] References Cited

U.S. PATENT DOCUMENTS

4,547,854 10/1985 Hashimoto et al. ............ 364/474.21
4,660,148 4/1987 Kishi et al. ..................... 364/474.25
4,739,488 4/1988 Asakura ......................... 364/474.21

*Primary Examiner*—Jerry Smith
*Assistant Examiner*—Steven R. Garland
*Attorney, Agent, or Firm*—Sixbey, Friedman, Leedom & Ferguson

[57] ABSTRACT

A numerically controlled machining data for controlling a numerically controlled machine tool on the basis of a shape model representing a product to be machined by the numerically controlled machine tool is produced by the steps of storing in a memory position data of each machined portion on the shape model and machining attribute data on contents of machining to be carried out for the machined portion, reading out from the memory the machining attribute data for a specified machined portion, obtaining data on the order in which tools are used and data on the machining condition from a machining information file according to the machining attribute data read out, and converting the data on the order in which tools are used, the data on the machining condition and the position data of each machined portion into numerically controlled machining data conforming to the numerically controlled machine tool.

4 Claims, 9 Drawing Sheets

| DIAGRAM NO. | SHAPE | GEOMETRIC INFORMATION | CONNECTION POINTER |
|---|---|---|---|
| .... | .... | .... | .... |
| 1200 | CIRCLE | OOOO OOOO | xxxx xxxx |
| .... | .... | .... | .... |
| 1510 | CURVE | OOOO OOOO | xxxx xxxx |
| .... | .... | .... | .... |
| 1800 | CURVE | OOOO OOOO | xxxx xxxx |
| .... | .... | .... | .... |

T1

| DIAGRAM NO. | MACHINING CODE | TYPE |
|---|---|---|
| 1200 | H220010 | HOLE |
| 1210 | M012030 | TAPPED HOLE |
| 1510 | P012000 | PROFILE |
| 1800 | CO20000 | SHAPING |
| .... | .... | .... |

| TYPE OF MACHINING / PROCEDURE | H2 | M0 | P0 |
|---|---|---|---|
| 1 | CENTER DRILL | CENTER DRILL | END MILL |
| 2 | PREPARED HOLE DRILL | PREPARED HOLE DRILL | |
| 3 | END MILL | CHAMFERING DRILL | |
| 4 | CHAMFERING DRILL | TAP | |
| 5 | REAMER | | |
| 6 | | | |

FIG. 5

| TOOL / DIRECTION MATERIAL | CENTER DRILL (ØD) AXIAL | CENTER DRILL (ØD) DIAMETRICAL | DRILL (ØD) AXIAL | DRILL (ØD) DIAMETRICAL | END DRILL (ØD) AXIAL | END DRILL (ØD) DIAMETRICAL | REAMER (ØD) AXIAL | REAMER (ØD) DIAMETRICAL | ... |
|---|---|---|---|---|---|---|---|---|---|
| SS 41 | F=○ S=○ | ✕ | F=○ S=○ | F=○ S=○ | F=○ S=○ | F=○ S=○ | F=○ S=○ | F=○ S=○ | |
| ---- | ---- | | ---- | ---- | ---- | ---- | ---- | ---- | |
| S45C | F=○ S=○ | ✕ | F=○ S=○ | F=○ S=○ | F=○ S=○ | F=○ S=○ | F=○ S=○ | F=○ S=○ | |
| ---- | ---- | | ---- | ---- | ---- | ---- | ---- | ---- | |
| ---- | ---- | | ---- | ---- | ---- | ---- | ---- | ---- | |

FIG. 6

| REGISTERED NO. | CODE | TOOL | STARTING DEPTH | ENDING DEPTH | DIAMETER | F | S | PRIORITY |
|---|---|---|---|---|---|---|---|---|
| 1 | H220010 | 1 | ○ | ○ | ○ | ○ | ○ | ○ |
|  |  | 2 | ○ | ○ | ○ | ○ | ○ | ○ |
|  |  | 3 | ○ | ○ | ○ | ○ | ○ | ○ |
|  |  | 4 | ○ | ○ | ○ | ○ | ○ | ○ |

| REGISTERED NO. | CODE | TOOL | STARTING COORDINATED | | | DIAMETER | F | S | PRIORITY |
| | | | X | Y | Z | | | | |
|---|---|---|---|---|---|---|---|---|---|
| 10 | C020000 | 1 | ○ | ○ | ○ | ○ | ○ | ○ | ○ |

FIG. 7

INPUT

NAME OF MACHINE, NUMBER OF SETTING TABLE, NAME OF TOOL, DIAMETER OF TOOL

| NAME OF MACHINE | | | | NUMBER OF SETTING TABLE |
|---|---|---|---|---|
| DIAMETER OF TOOL | NAME OF TOOL | TOOL NUMBER | CORRECTION NUMBER | NOTE |
| 4.0 | CENTER DRILL | T01 | H01 | |
| 8.0 | REAMER | T02 | H02 | |
| ⋮ | ⋮ | ⋮ | ⋮ | |
| · | · | · | · | |
| 10.0 | DRILL | T29 | H29 | |
| 12.0 | DRILL | T30 | H30 | |

TOOL NUMBER, CORRECTION NUMBER

OUTPUT

FIG. 8

METHOD OF AND SYSTEM FOR PRODUCING DATA FOR NUMERICALLY CONTROLLED MACHINING

This application is a continuation of Ser. No. 07/623,682, filed Dec. 6, 1990, now abandoned.

BACKGROUND OF THE INVENTION

1. Field of the Invention

This invention relates to a method of and a system for producing NC machining data for machining a product by a numerically controlled machine tool on the basis of, for instance, a three-dimensional shape model produced by a CAD (computer aided design).

2. Description of the Prior Art

Recently there has come into wide use an automatic programming system for controlling a numerically controlled machine tool by the use of a computer.

As such an automatic programming system, there have been known an APT, EXAPT, AUTOSPOT, FAFT and the like. The APT calculates geometric tool paths and can calculates the tool paths of a simultaneous multiple spindle control machine tool. The EXAPT can calculate the working condition of a drilling machine, a lathe or the like in addition to the tool path thereof. When controlling the numerically controlled machine tool by the automatic programming system, a numerical control tape must be produced, and in order to produce the numerical control tape, a part program must first be prepared. The part program is a program in which how the tool is moved is written in the language of the system. The prepared part program is input into a main processor and is used in a geometric operation, whereby CL (Cutter Location) data, in which the tool paths are expressed using a generalized coordinate system, are obtained. Thereafter, the CL data are input into a postprocessor and are converted into a machine coordinate system, thereby corrected to values which conform to the tape format of the numerically controlled machine tool. Then predetermined NC (numerical control) codes such as G, F, T, M and the like are inserted.

However the part program cannot be directly obtained from a three-dimensional design data of a product shape model produced by a CAD. This is because though such a three-dimensional design data includes therein data on the position of each machined portion and, for example, when the machined portion is a hole, the position of the center of the hole can be read from the three-dimensional design data, the three-dimensional design data includes no data on the attribute of the machining to be carried out, such as those from which whether the hole is a reamed hole, or a threaded hole can be known. Accordingly, the operator must determine the attribute of the machining to be carried out for each portion and the part program is prepared by combining the attribute of the machining determined by the operator with the data on the position of each machined portion. Therefore, in the conventional system, it takes a very long time to prepare the part program, and further the part program must be converted into CL data and the CL data further must be converted into NC codes.

Further since the part program includes the data on the position of each machined portion, the part program must be prepared for each kind of product.

SUMMARY OF THE INVENTION

In view of the foregoing observations and description, the primary object of the present invention is to provide a method which makes it possible to produce data for machining a workpiece by a numerically controlled machine tool on the basis of a shape model quickly and at high efficiency.

Another object of the present invention is to provide a system for carrying out the method.

In accordance with one aspect of the present invention, there is provided a method of producing numerically controlled machining data for controlling a numerically controlled machine tool on the basis of a shape model representing a product to be machined by the numerically controlled machine tool, said method comprising the steps of storing, in a memory position, data of each machined portion on the shape model and machining attribute data on the contents of the machining to be carried out for the machined portion, reading out from the memory the machining attribute data for a specified machined portion, obtaining data on the order in which tools are used and data on the machining condition from a machining information file according to the machining attribute data read out, and converting the data on the order in which tools are used, the data on the machining condition and the position data of each machined portion into numerically controlled machining data conforming to the numerically controlled machine tool.

In accordance with another aspect of the present invention, there is provided a system for producing numerically controlled machining data for controlling a numerically controlled machine tool on the basis of a shape model representing a product to be machined by the numerically controlled machine tool, said system comprising a memory means which stores position data of each machined portion on the shape model and machining attribute data on the contents of the machining to be carried out for the machined portion, a machining attribute read-out means which specifies a machined portion and reads out from the memory means the machining attribute data for the specified machined portion, a machining information file which outputs data on the order in which tools are used and data on the machining condition in response to input of the machining attribute data read out, and a data converting means which converts the data on the order in which tools are used, the data on the machining condition and the position data of each machined portion into numerically controlled machining data conforming to the numerically controlled machine tool.

In accordance with the present invention, the attribute of the machining to be carried out for a given machined portion is read out by specifying the machined portion, and the data on the order in which tools are used and the data on the machining condition for the attribute of the machining are obtained from the machining information file. Accordingly the program on the attributes of the machining can be automatically obtained without the proportion of a part program by an operator. Accordingly, in accordance with the present invention, the part program and the CL data, which conventionally must be prepared, need not be prepared.

The data on the order in which tools are used and the data on the machining condition obtained in the manner described above are combined with the position data for the machined portions in the shape model to obtain the cutting path in the final stage of the programming. Accordingly, up to the final stage, programming for the attributes of only the machining has to be progressed while programming for position data for the machined portions which are different in values in different shape models need not be progressed. Accordingly, the same machining information file can be used for obtaining the data on the order in which tools are used and the data on the machining condition for different shape models.

DESCRIPTION OF THE PREFERRED EMBODIMENT

Figure 1:
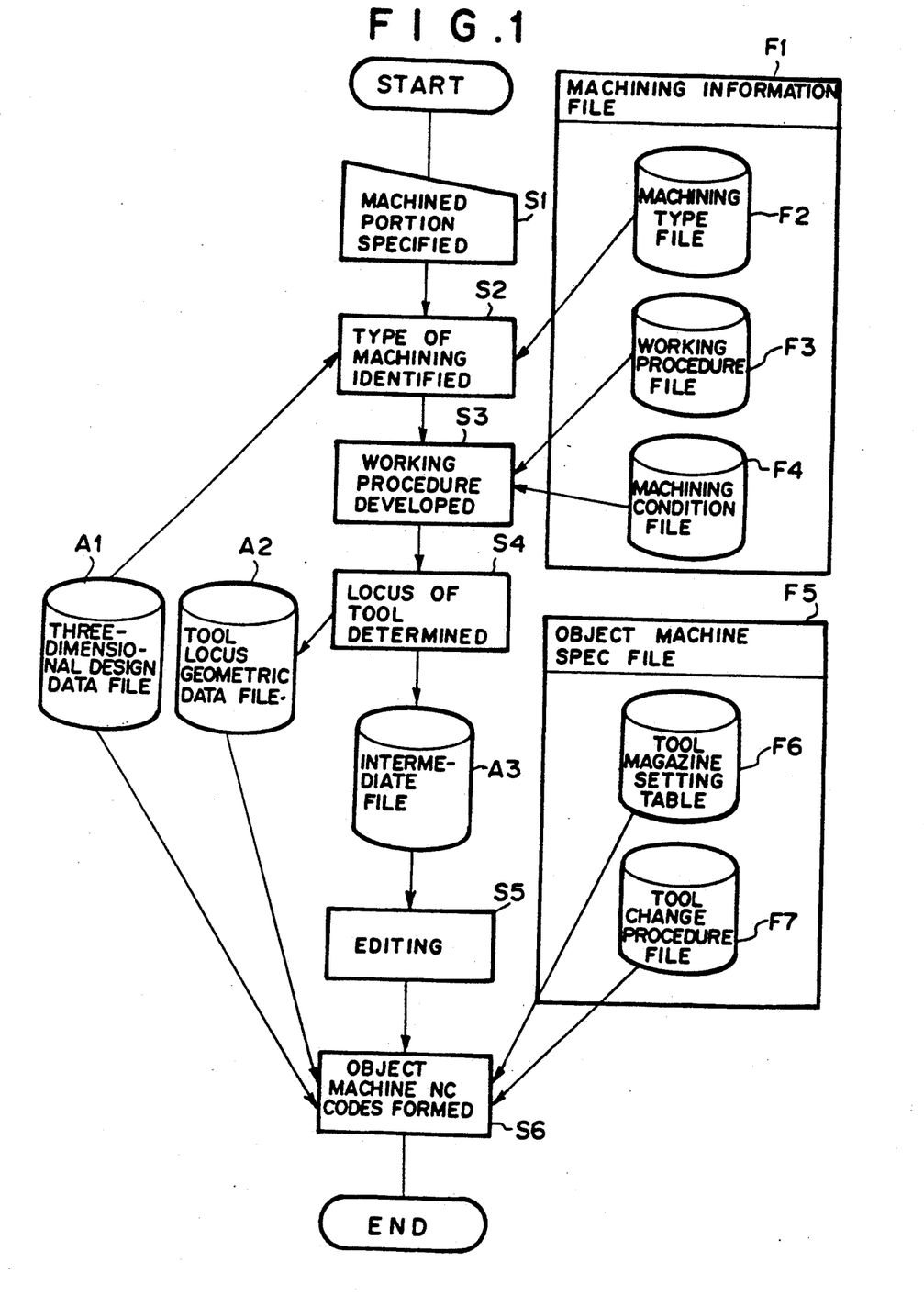
FIG. 1 is a flow chart for illustrating a method of producing data for machining a workpiece by a numerically controlled machine tool in accordance with an embodiment of the present invention.

In accordance with an embodiment of the present invention, data for machining a workpiece by a numerically controlled machine tool (will be referred to as "NC machining data", hereinbelow) is prepared according to the flow chart shown in FIG. 1.

Figure 2:
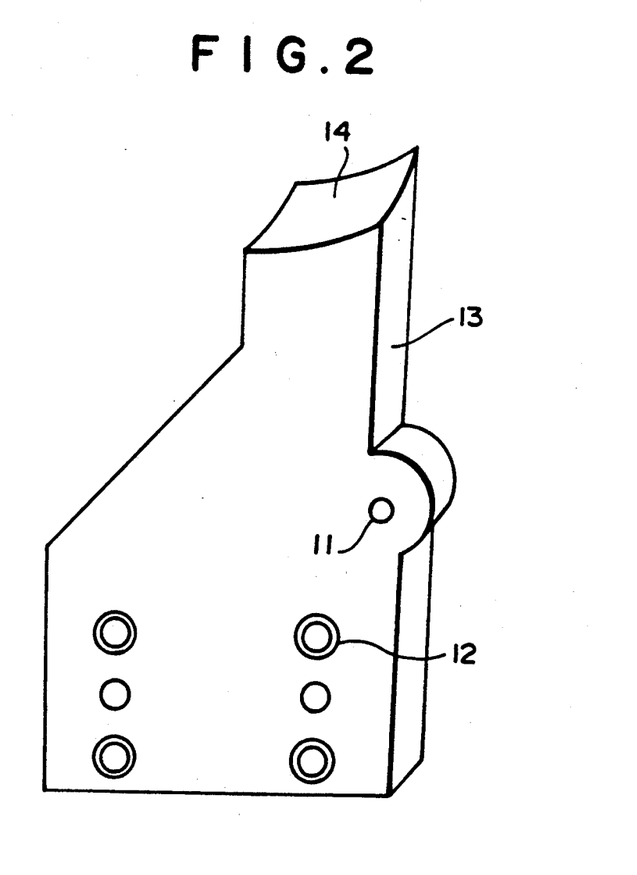
FIG. 2 is a schematic perspective view of a product.

The method in accordance with this embodiment will be described as applied to produce a locator plate (which is used as a jig for assembling a vehicle body) shown in FIG. 2.

In order to prepare NC codes for all machined portions of a shape model of a product prepared by a CAD, all the machined portions must be successively specified. The three-dimensional shape model of the locator plate has a large number of machined portions. Machinings are separated into three basic types, drilling, profiling and shaping. Knock holes 11 and tapped holes 12 are formed by drilling, periphery 13 is cut out by profiling, and a curved outer surface 14 is formed by shaping. The knock holes 11 and the tapped holes 12 are machined in different ways, the former being reamed and the latter being tapped. All of these machined portions must be specified.

The first step (step S1) to prepare the NC machining data is a step of specifying machined portions or machined parts. Then, in the next step S2, types of machinings are identified. This step is a step of reading out data on attributes of the machinings from a three-dimensional design data file A1 which specifies the shape model of the product, and identifying the types of machinings according to the attributes of the machinings on the basis of a machining type file F2 in a machining information file F1. The next step S3 is a working procedure developing step in which the order of tools is determined on the basis of a working procedure file F3 in the machining information file F1 according to the types of machinings identified in step S2 and the machining condition for each tool is determined on the basis of a machining condition file F4 in the machining information file F1. In the next step S4, a locus of tool is determined for each type of machining. The locus of tool is not a cutter path along which the tool is moved from one machined portion to another, but rather a path along which the tool is moved within a portion to machine the portion, and is automatically determined according to the type of machining, the working procedure, the machining condition, and the like. The loci of the tools determined in step S4 are once stored in a tool locus geometric data file A2. The data on the type of machining, the working procedure and the machining condition for each portion are once stored in a machining information intermediate file A3. Step S5 is an editing step in which the data stored in the machining information intermediate file A3 is edited with respect to the working procedure. In the step S5, the order of the tools to be used is rearranged in order to operate the numerically controlled machine tool at a higher efficiency. Thereafter, NC codes for an object machine are produced in step S6. In step S6, the data edited in step S5, the position data of each machined portion machined in the three-dimensional design data file A1, and the tool locus geometric data in the tool locus geometric data file A2 are combined together and converted into NC codes conforming to the object machine on the basis of a tool magazine setting table F6 and a tool change procedure file F7 of an object machine specification file F5, whereby NC machining data is produced. The machining information file F1 and the object machine specification file F5 are data files which have been prepared in advance and are applicable to the production of NC machining data for products of various shapes. When NC machining data for different products are produced, the operator has only to prepare data to be set in the three-dimensional design data file A1.

Figure 3:
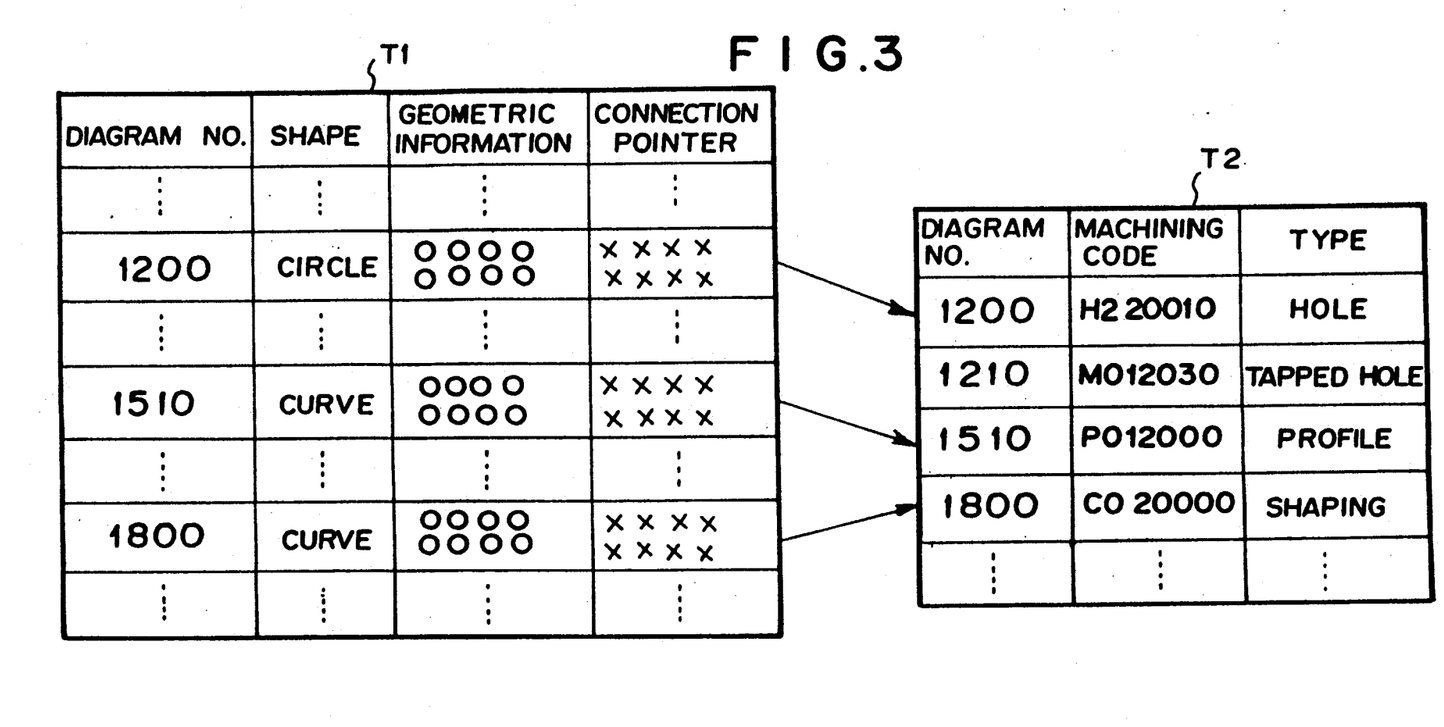
FIG. 3 is a table showing an example of the three-dimensional design data file.

The flow chart shown in FIG. 1 will be described in more detail, hereinbelow. FIG. 3 shows the three-dimensional design data file A1 in the form of a table. The three-dimensional design data includes, for each machined portion, a geometric information table T1 which provides the position data for the portion and a machining attribute table T2 which provides the contents of the machining for the portion. The geometric information table T1 is obtained by tabling data output from the CAD, and in the geometric information table T1, each of the machined portions of the shape model (e.g., a hole, an outer surface, etc.) is represented by a diagram number specific to the portion so that when a diagram number is specified, one machined portion is specified. Several thousands of such diagram numbers are generally prepared for one product. Each diagram number carries a diagram of the machined portion (e.g., circle or curve), geometric information which is position data representing where the machined portion is positioned in the whole product, and a connection pointer which, when the machined portion is of two diagrams connected with each other, facilitates connection of the two diagrams.

However, the attribute of the machining to be carried out for the machined portion cannot be known from the data in the geometric information table T1 only. When diagram number 1200 is specified, for instance, it can be known that the shape of the machined portion is a circle (i.e., the portion is a hole) and the position of the center of the hole can be known from the geometric information, but whether the hole is to reamed or tapped cannot be known. Further, neither the diameter of the prepared hole for the hole nor the depth of the hole can be known. In this embodiment, a machining code which represents the attributes of the machining to be carried out for each machined portion is related to the diagram number for the machined portion in the machining attribute table T2. Accordingly, when a diagram number is specified, the attribute of the machining to be carried out for the portion corresponding to the diagram number can be known on the basis of the machining attribute table T2. As for the machined portions where the attributes of the machining to be carried out are the same, all of them can be successively searched for on the basis of the machining code by specifying the diagram number of one of them. The machining code carries the type of machining, the outer diameter, the depth, and the like. For example, in the machining code H220010 for diagram number 1200, "H2" represents that the hole is to be reamed, "20" represents the diameter of the finished hole, and "010" represents the depth of the hole. "MO" is a code representing drilling of a tapped hole, "PO" is a code representing profiling, and "CO" is a code representing shaping.

Figure 4:
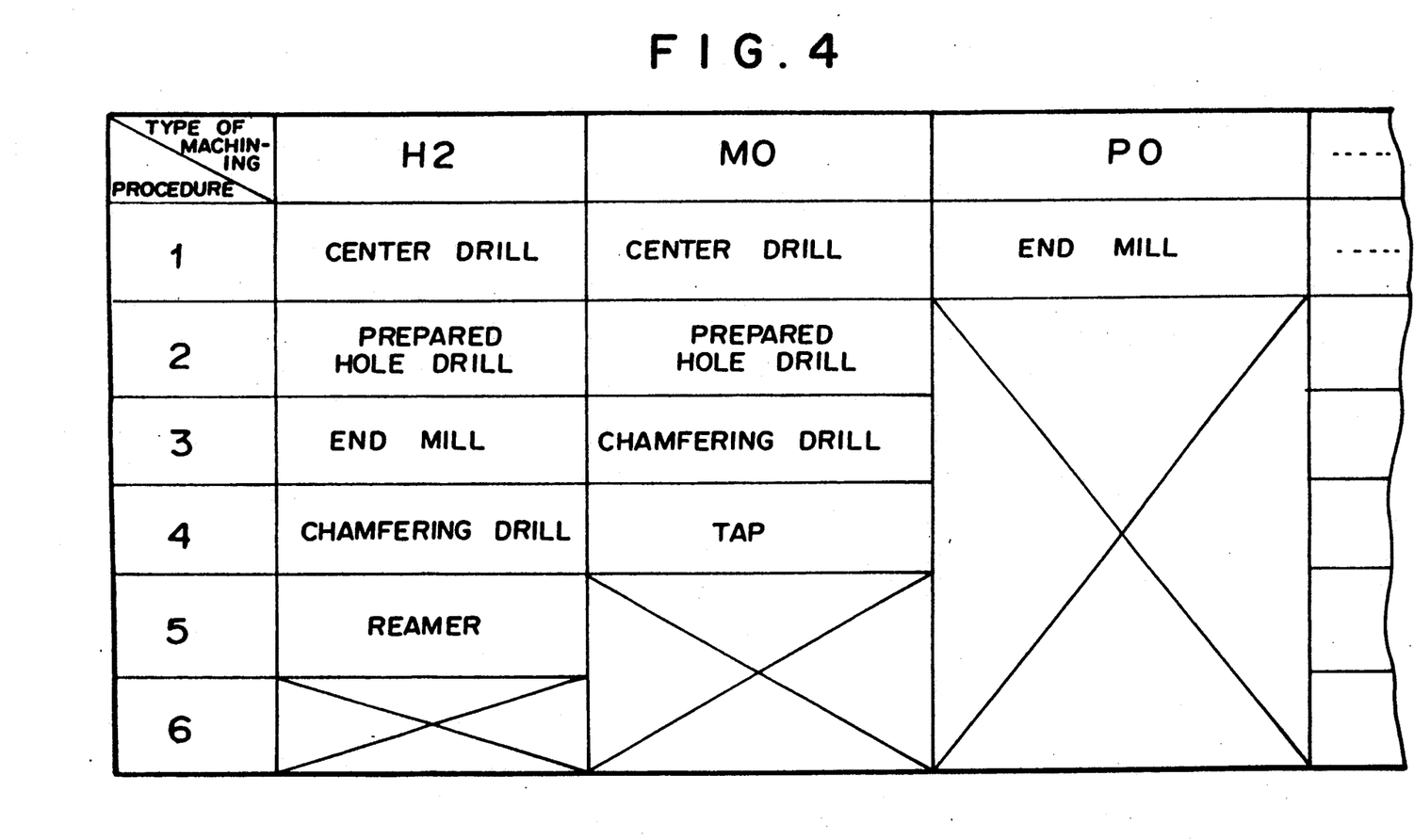
FIG. 4 is a table showing examples of the machining type file and working procedure file.

The data on the attribute of the machining are read from the three-dimensional design data file A1 shown in FIG. 3 in step S2. The type of the machining to be carried out in a given machined portion can be recognized by pattern-matching of the code of the upper two places in the data read from the three-dimensional design data file A1 with the codes in the machining type file F2. The machining type file F2 is related to the working procedure file F3 used in the working procedure developing step S3 as shown in FIG. 4. That is, when diagram number 1210 is specified, for instance, and machining code MO12030 is read out, pattern-matching of the machining type code sign (the upper two places "MO" which represents a tapped hole) with signs in the machining type file F2 is carried out. When sign "MO" is detected in the machining type file F2, the working procedure developing step S3 is carried out using the working procedure file F3. In the working procedure file F3, tools used in carrying out the type of machining represented by each of the machining type code sign are arranged in the order in which they are to be used. For example, when sign "MO" is detected, the tools arranged in the column below sign "MO" in the table shown in FIG. 4 are read out in sequence from the top. That is, center drill, prepared hole drill, chamfering drill and tap are read out in this order.

When carrying out shaping, a wire cut machine may be conveniently used in the case where the machined portion is inclined toward the axis of the tool and the tool access is difficult.

Figure 5:
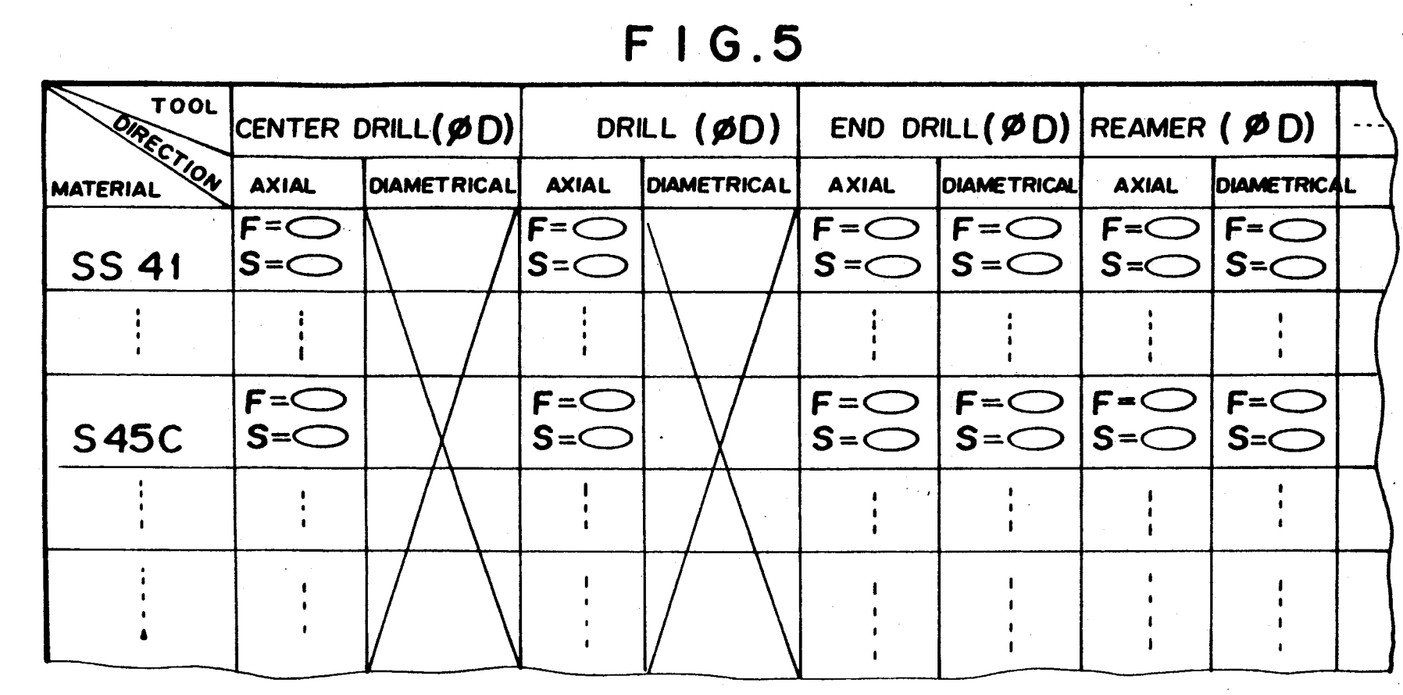
FIG. 5 is a table showing an example of the machining condition file.

When the order in which the tools are used is thus determined, the machining conditions for the tools are read out from the machining condition file F4. As shown in FIG. 5, the machining condition file F4, the axial and/or radial feed rate (F) of the tool and the speed of revolution (S) of the tool are related to the kind of tool, the diameter of the tool and the material of the workpiece. The diameter of the tool ($\Phi$D) is equal to the diameter of the prepared hole determined for each tool on the basis of the diameter of the finished hole, which has been determined in the working procedure developing step.

As described above, data on the locus of tool is produced for each machined portion in step S4. In the case of drilling where the tool is fed only the direction of depth of the hole to be drilled, the locus of tool is not produced, and the data on the locus of tool is produced for the profiling or shaping. The data produced in step S4 is stored in the tool locus geometric data file A2, and the machining code, the names of tools, the order in which the tools are used, the feed rates of the tools (F), the speeds of revolution of the tools (S) and the like are stored in the machining information intermediate file A3. The machining information intermediate file A3 is a file in which the names of the tools or the like which was obtained in the preceding steps are temporarily stored when the NC codes are not produced on the spot. Accordingly, when the NC codes are produced on the spot, the machining information intermediate file A3 need not be used.

Figure 6:
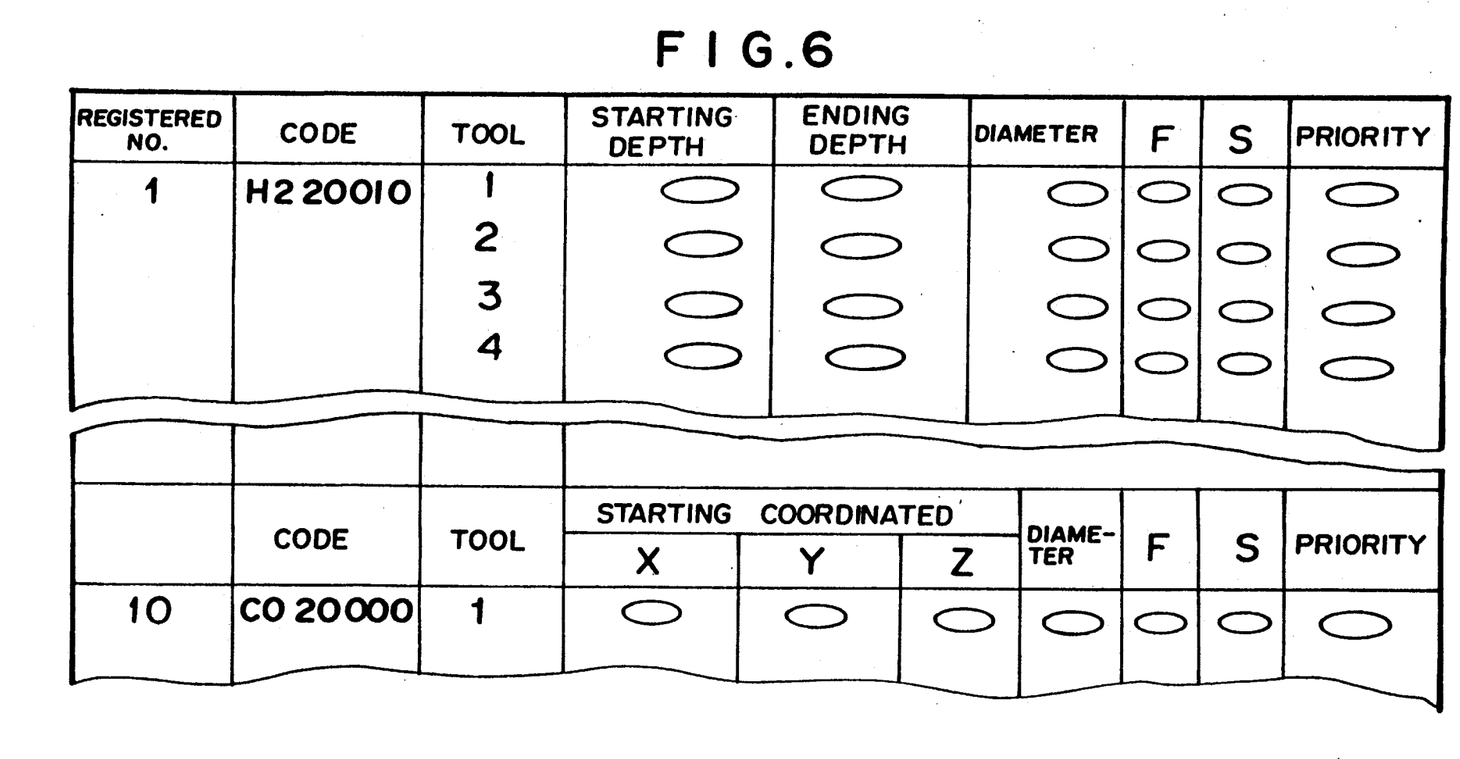
FIG. 6 is a table showing an example of the machining information intermediate file.

FIG. 6 is a table showing the machining information intermediate file A3. In this table, registration number 1 represents the machined portion corresponding to diagram number 1200 in the table shown in FIG. 3, and registration number 10 represents the machined portion corresponding to diagram number 1800 in the table shown in FIG. 3. Thus the contents of the table for the respective registration numbers differ because of difference in operation. In relation to registration number 1, the machining starting depth and the machining ending depth for each tool are stored. In relation to registration number 10, the machining starting coordinates (X, Y, Z) for each tool are stored. The machining starting depth, the machining ending depth and the machining starting coordinates (X, Y, Z) are obtained from the geometric data in the three-dimensional design data. In the table shown in FIG. 6, the diameter represents the diameter of the tool, and the priority represents the order of priority of no use of the tools which is used in editing the working procedure in step S5.

The data stored in the machining information intermediate file A3 are read out when the NC codes are produced and are used in editing the working procedure in step S5. The editing step S5 is carried out for increased efficiency in machining. For example, when it is assumed that the center drill is first used in drilling all the holes, it is more efficient to continuously effect center drilling for all the holes to be drilled than to effect all the drilling steps for one hole and then to effect all the drilling steps for another hole. In such a case, the order in which the tools are used is rearranged.

Figure 7:
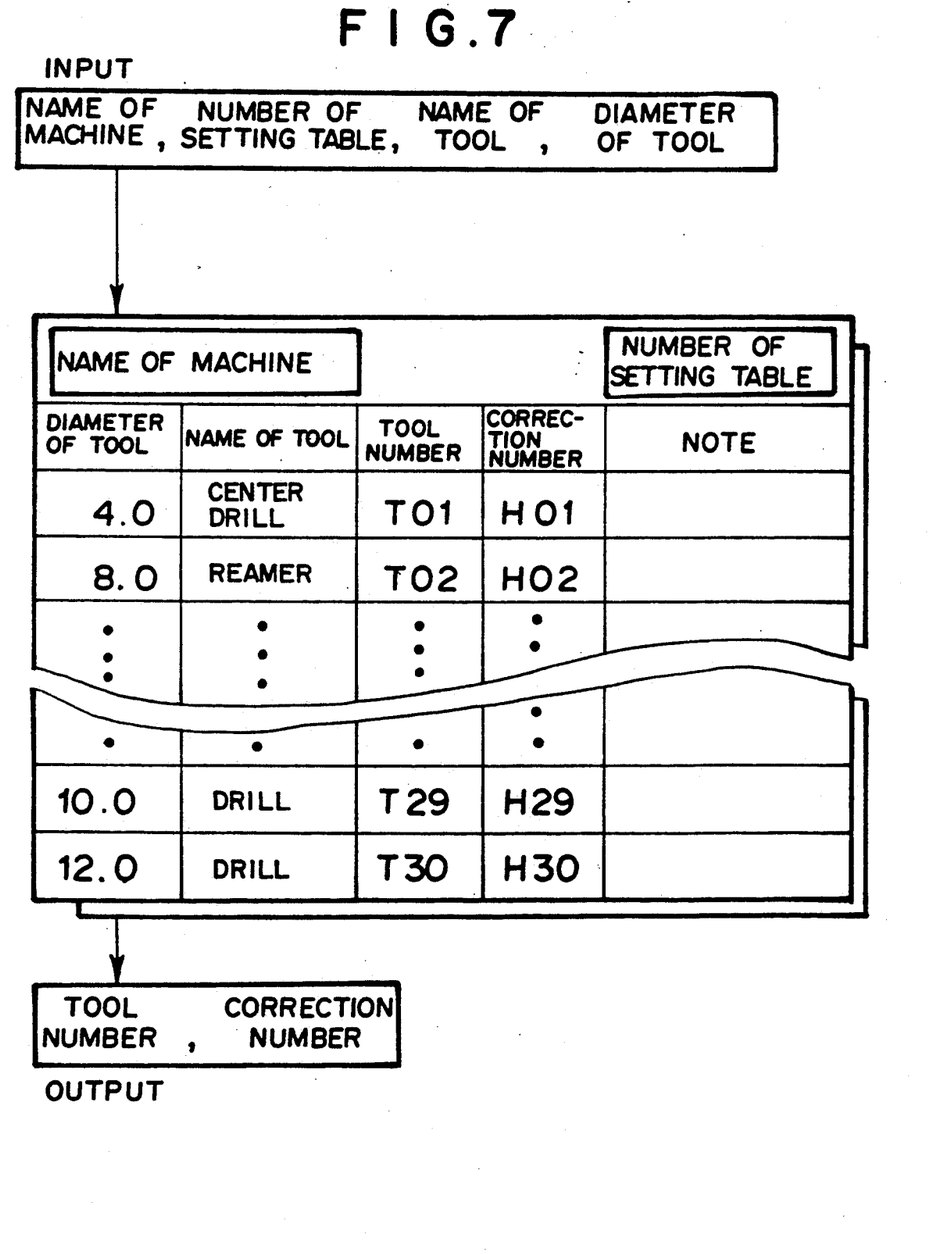
FIG. 7 is a view showing an example of the tool magazine setting table.

After the working procedure editing step S5, the NC codes for an object machine are produced in step S6. In step S6, the data on the attribute of the machining output from the step S5, the data on the locus of the tools for each machined portion, and the position data for each machined portion are combined, and the NC codes which conforms to the specification of the object machine are produced on the basis of these data. That is, the position data for each machined portion stored in the three-dimensional design data file A1 are not read out until step S6, and no processing for the position data is effected theretofore. Accordingly, preparation of the part program and conversion of the CL data can be omitted. The object machine specification file F5 for conforming those data to the specification of the object machine includes the tool magazine setting table F6 and the tool change procedure file F7 as described above. The tool magazine setting table F6 is a table as shown in FIG. 7 in which tool numbers given to tool pockets of the object machine are related to the kinds of tools in the respective tool pockets. That is, the tool magazine setting table F6 is prepared for each of the machines which may be used, and each tool magazine setting table F6 is provided with a table number specific to the table. The tool magazine setting table F6 shown in FIG. 7 is for a machine having thirty tool pockets in which tools which differ from each other in kind and/or diameter are provided. Each of the tools is provided with a tool number and a correction number which are specific to the tool. The correction number for each tool corresponds to a correction value which represents the vertical offset of the tool. Accordingly, as shown in FIG. 7, when data in which the name of the object machine, the number of the tool magazine setting table F6, the kind of the tool and the diameter of the tool are specified are input, the tool number and the correction number are output.

Figure 8:
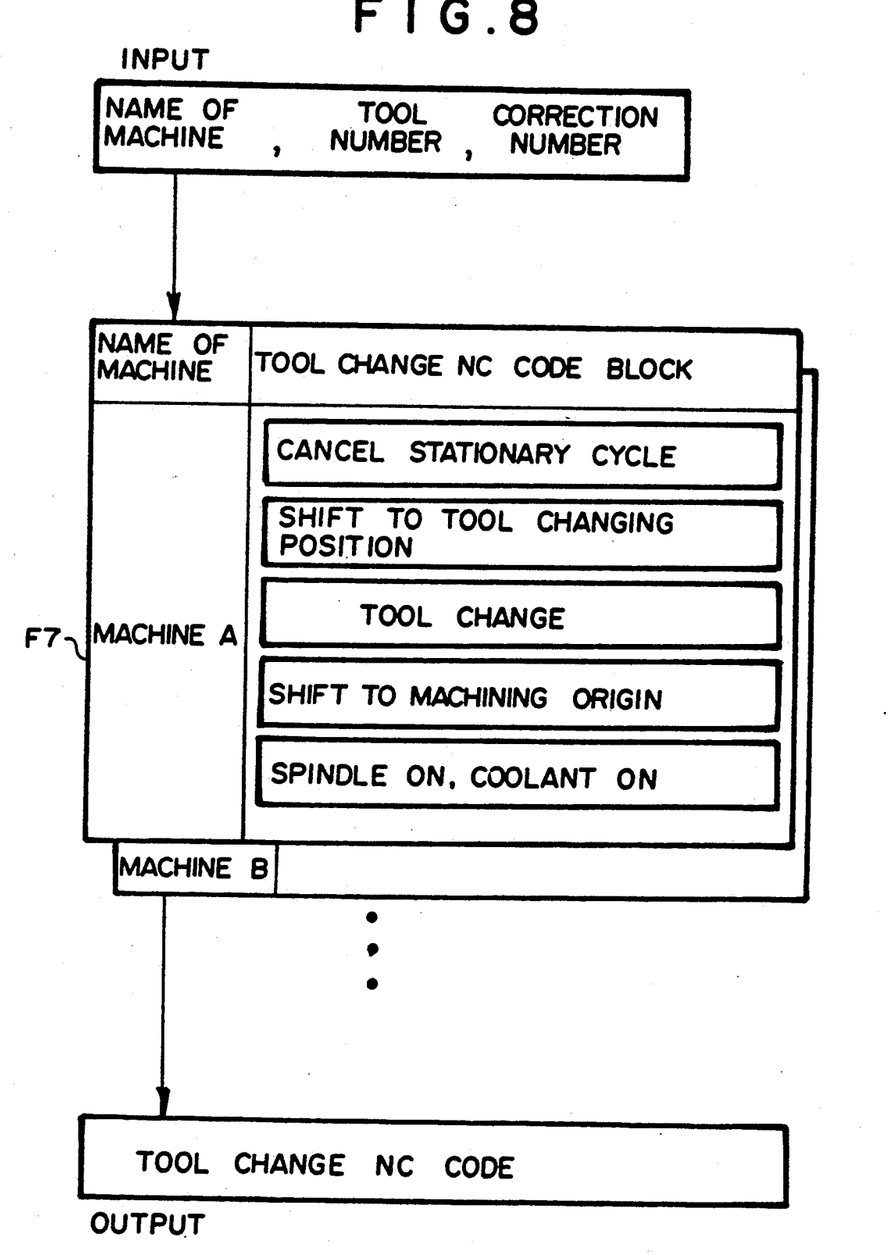
FIG. 8 is a view showing an example of the tool change procedure file.

The tool change procedure file F7 is a file in which the names of the object machines and the tool numbers are related to tool change procedures as shown in FIG. 8. Since the procedures to change tools differ according to the types of machines and the kinds of tools, a tool change NC code block comprising a series of tool change NC codes, e.g., NC codes representing "cancel of the stationary cycle and the like", "shift to tool changing position", "tool change", "shift to the machining origin", "spindle on" and "coolant on", is prepared for each combination of machine and tool. By inputting the name of the object machine, the tool number and the correction number, the tool change NC codes corresponding to the combination of the machine and the tool are output from the tool change procedure file F7.

Figure 9:
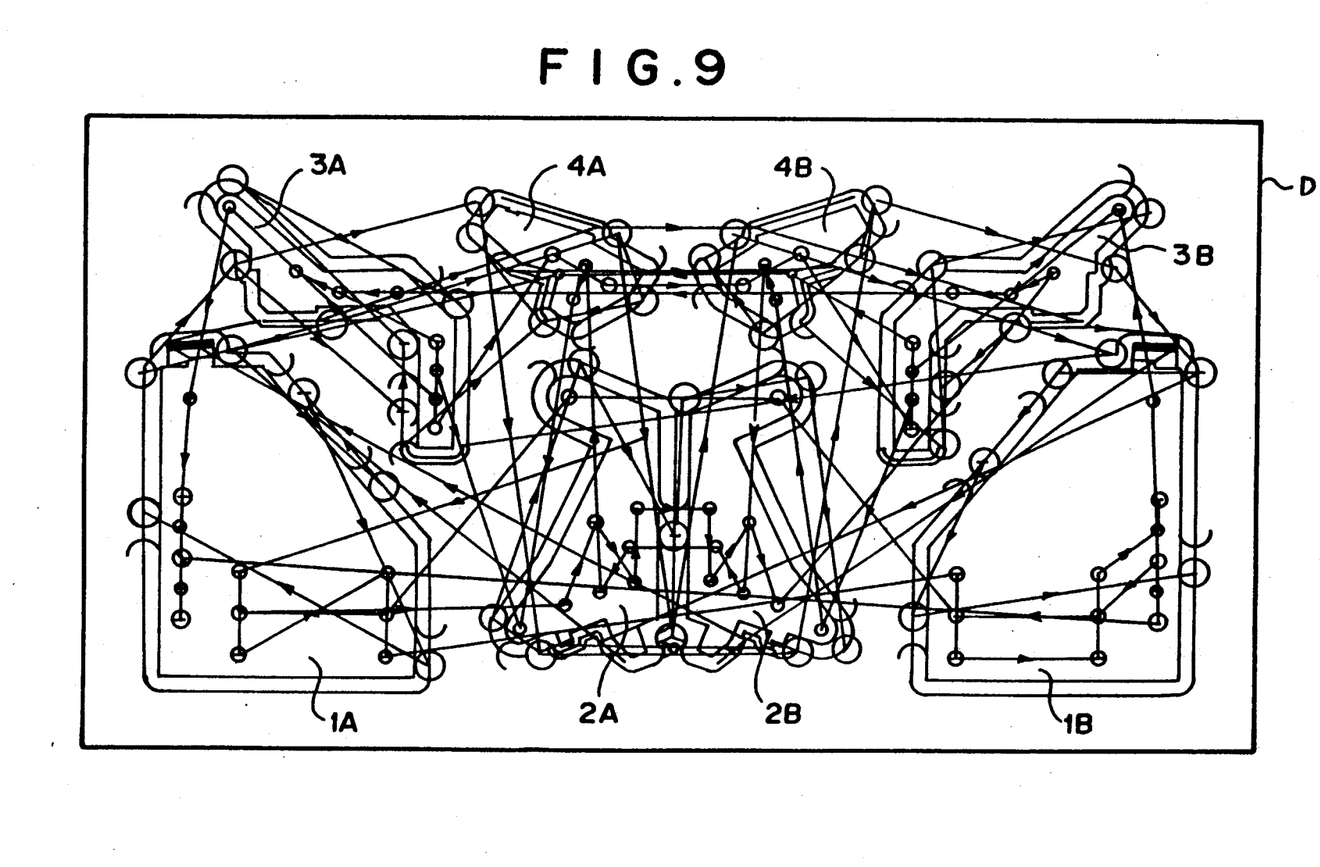
FIG. 9 is a view showing an example of the tool path based on the NC machining data produced in accordance with the method of the present invention.

The object numerically controlled machine tool operates on the NC machining data thus formed and a product which conforms to the three-dimensional shape model produced by the CAD is produced. FIG. 9 shows an example of the tool path based on the NC machining data produced in accordance with the method of the present invention in order to cut out four pairs of parts 1A, 1B; 2A, 2B; 3A, 3B and 4A, 4B, from a single metal plate D, one of each pair being a left side part and the other being a right side part. When a plurality of products are cut from a single plate material, as shown in FIG. 9, or from a plurality of plate materials flush with each other and when the machined portions in different products which are the same in the type of machining and the kind of tool to be used are machined continuously, the number of tool changes can be reduced and the machining efficiency can be increased.

The three-dimensional design data file A1, the tool locus geometric data file A2, the machining information intermediate file A3, the machining information file F1 and the object machine specification file F5 are stored in the respective reloadable memories (including a magnetic disk, an optical disk and the like). Reading out the attribute of the machining from the three-dimensional design data file A1, inputting and outputting data into and from the memories, changing the data, and conversion of the data are carried out in response to commands of a controller having a built-in CPU (not shown).

The method of the present invention need not be limited to the embodiment described above and the embodiment described above can be modified in various ways. For example when the NC codes can be produced immediately after the step of determining the locus of tool (step S4), the data on the type of machining, the working procedure and the machining condition need not be stored in the machining information intermediate file A3. Further when the machining procedure is not so complicated, the machining procedure editing step S5 need not be carried out. Further, the object machine specification file F5 can be omitted.

I claim:

1. An automatic method of producing numerically controlled machining data for controlling a numerically controlled machine tool on the basis of a shape model representing a product to be machined by the numerically controlled machine tool, said method comprising the steps of storing in a memory position data of each portion of the product to be machined on the shape model and machining attribute data on contents of machining to carried out for the portion of the product to be machined, reading out from the memory the machining attribute data for a specified portion to be machined, obtaining data on an order in which tools are used and data on a machining condition from a machining information file according to the machining attribute data read out, and converting the data on the order in which tools are used, the data on the machining condition and the position data of each portion to be machined into numerically controlled machining data conforming to the numerically controlled machine tool; wherein said steps of storing, reading, obtaining and converting the data are executed under the control of a central processing unit.

2. A method as defined in claim 1 in which the machining attribute data, the data on the order in which tools are used and the data on the machining condition are initially stored in an intermediate file before converting the data on the order in which tools are used, the data on the machining condition and the position data of each portion to be machined into numerically controlled machining data conforming to the numerically controlled machine tool.

3. A method as defined in claim 1 in which the data on the order in which tools are used is edited according to an actual working procedure.

4. A system for producing numerically controlled machining data for controlling a numerically controlled machine tool on the basis of a shape model representing a product to be machined by the numerically controlled machine tool, said system comprising a memory means which stores position data of each portion of the product to be machined on the shape model and machining attribute data on contents of machining to be carried out for the portion of the product, a machining information file which outputs data on the order in which tools are used and data on a machining condition in response to input of a machining attribute data read out, a data converting means which converts the data on the order in which tools are used, the data on the machining condition and the position data of each portion to be machined into numerically controlled machining data conforming to the numerically controlled machine tool, and a central processing unit for automatically controlling the operation of the system including executing the input of the data into the memory means, operating the machining information file and controlling the data converting means.

* * * * *